United States Patent
Fremont et al.

(10) Patent No.: US 8,606,894 B1
(45) Date of Patent: Dec. 10, 2013

(54) SERVER CONSOLIDATION

(75) Inventors: Marie-Jo L. Fremont, Palo Alto, CA (US); Alex X. Zhang, San Jose, CA (US); Fereydoon Safai, Los Altos Hills, CA (US); Jerome Rolia, Kanata (CA); Keith I. Farkas, San Carlos, CA (US); Dirk M. Beyer, Walnut Creek, CA (US); Martin F. Arlitt, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 11/412,347

(22) Filed: Apr. 27, 2006

(51) Int. Cl.
*G06F 15/173* (2006.01)

(52) U.S. Cl.
USPC .................. 709/223; 709/224; 709/226

(58) Field of Classification Search
USPC ................................... 709/224, 221
See application file for complete search history.

(56) References Cited

U.S. PATENT DOCUMENTS

| | | | |
|---|---|---|---|
| 6,260,020 B1 * | 7/2001 | Ruffin et al. | 705/1 |
| 2002/0140743 A1 * | 10/2002 | DeLuca et al. | 345/835 |
| 2003/0225563 A1 * | 12/2003 | Gonos | 703/22 |
| 2004/0034577 A1 * | 2/2004 | Van Hoose et al. | 705/28 |
| 2006/0179171 A1 * | 8/2006 | Stefaniak et al. | 710/15 |
| 2006/0282825 A1 * | 12/2006 | Taylor | 717/127 |
| 2007/0226341 A1 * | 9/2007 | Mateo | 709/226 |

* cited by examiner

*Primary Examiner* — Kevin Bates
*Assistant Examiner* — Tom Y Chang

(57) ABSTRACT

A method for server consolidation is provided. The method includes collecting performance data of a plurality of source servers in a desired environment, selecting a group of one or more source servers from the plurality of source servers for consolidation, marking each source server in the with one of multiple usability statuses with one of such statuses indicates the marked source server is to be replaced or reused as necessary in the server consolidation, selecting a target platform for a new server, and performing a first server consolidation analysis of the first group based at least on the collected performance data, the initial usability status of each source server in the first group, and the first selected target platform.

13 Claims, 4 Drawing Sheets

SERVER CONSOLIDATION

CROSS-REFERENCE

This application is related to U.S. patent application Ser. No. 11/143,349, entitled, "PERFORMANCE-DATA BASED SERVER CONSOLIDATION", filed on Apr. 28, 2006, which is herein incorporated by reference in its entirety.

BACKGROUND

Businesses are interested in consolidating software applications that run on individual, often under-utilized, servers onto a smaller number of more effectively used ones. Such server consolidation is difficult to do as many technological and business factors need to be taken into account and large numbers of servers are typically involved. For example, relatively common consolidation projects typically involve the consolidation of a few hundred servers. The amount of performance data involved in analyzing server utilization and identifying performance bottlenecks is staggering, causing many users to rely only on summarized performance data (such as average or peak CPU utilization) for the analysis. However, such simple summarized data does not reflect the time-dynamic nature of the system performance and leads to overly conservative consolidation plans. For example, using a single CPU utilization number implicitly assumes that workload peaks across servers occur exactly at the same time, which is not a realistic assumption and negates the value of sharing workloads that are complementary in their time and resource usage patterns. Conventional solutions for server consolidation vary from simple rules of thumb to complex consolidation tools. Rules of thumbs typically lack the consistency and thoroughness and typically overlook performance data or issues.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
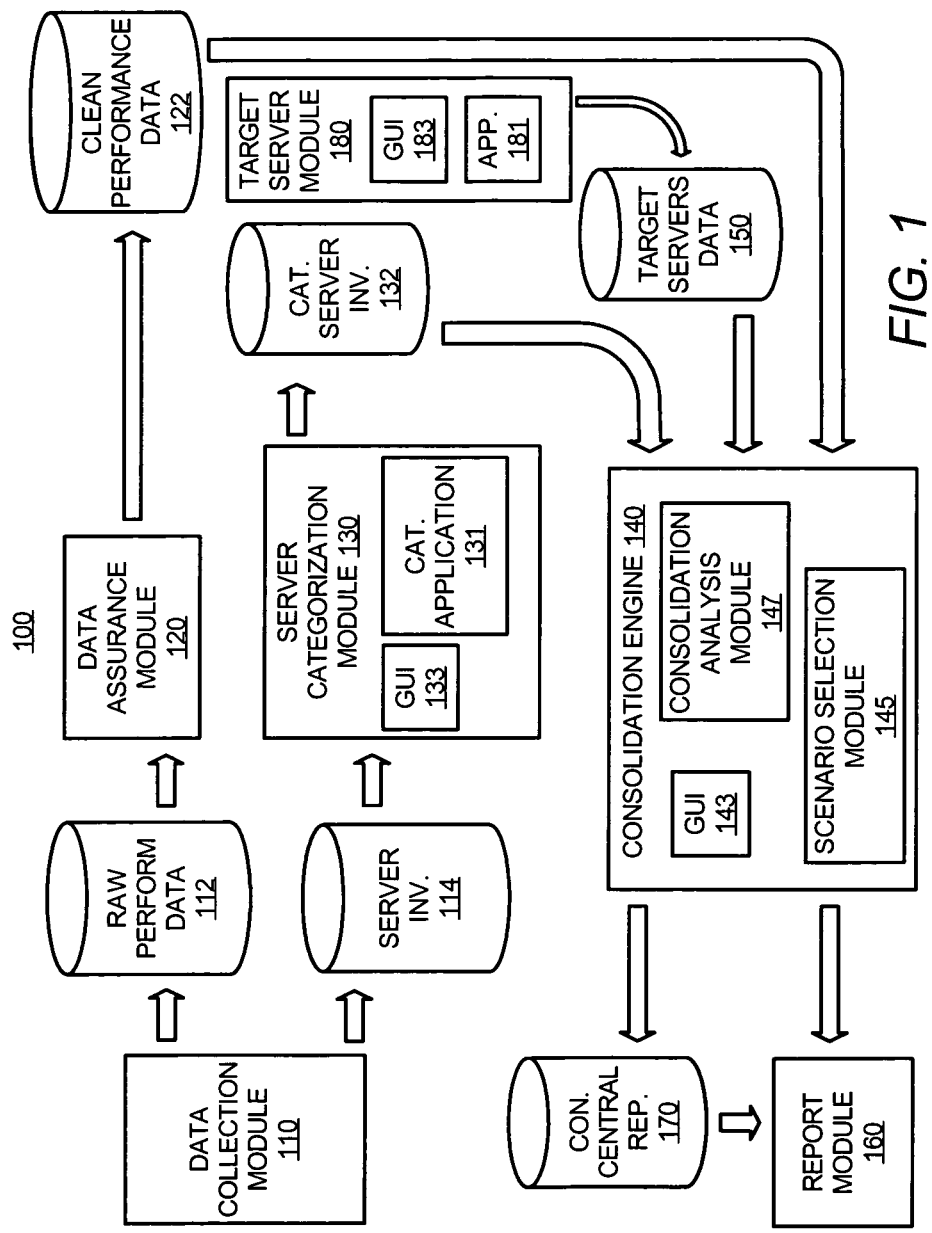
FIG. 1 illustrates a high-level architecture 100 for server consolidation, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Methods and systems for providing a systematic and consistent approach for consolidating servers and server consolidation services are described herein. Existing consolidation tools, such as CapacityPlanner software from WMware of Houston, Tex., usually do not provide much assessment of data or performance issues that potentially have existed and lack flexibility in terms of the analyses a user potentially wants to conduct. For example, the user potentially wants to perform quick consolidation analyses with various subsets or time windows of the performance data to reflect the time-dynamic nature of the system performance or explore different consolidation scenarios under different growth assumptions. This is because conducting multiple analyses and reporting results on consolidation scenarios are often difficult and time consuming as many parameters need to be considered. Also, existing consolidation tools do not offer a seamless integration across data quality assessment, analysis, and results. Furthermore, in the case of the WMware CapacityPlanner, users are required to collect the performance data using the WMware tool and transfer the data to an external site to perform any analysis. Such requirement is not acceptable by companies who have very strict policies on data confidentiality.

Accordingly, the methods and systems described herein provide users with structured techniques to seamlessly integrate across data quality management, analysis, and results, and evaluate and summarize many server consolidation scenarios easily and quickly and with reliance on consolidation analyses that are data-driven and for which the quality of the data has been assessed. As referred herein, a server is a computer or network of computers. Examples of a server include but are not limited to one or more desktop computers, one or more laptop computers, one or more mainframe computers, one or more networked computers, one or more processor-based devices, or any similar types of systems and devices. Thus, a server includes one or more processors of any of a number of computer processors, such as processors from Intel, Motorola, AMD, Cyrix. Each processor is coupled to or includes at least one memory device, such as a computer readable medium (CRM). The processor is operable to execute computer-executable program instructions stored in the CRM, such as program code of applications, to run the applications. The computer-executable program instructions include code from any suitable computer-programming language, such as C, C++, C#, Java, or the like. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions.

In one embodiment, there is provided a server consolidation tool that is operable with any data collectors, wherein it is possible to conduct analyses of data provided by one or more such data collectors. In another embodiment, a server consolidation tool is provided to the user with a combined checklist (or summary) and navigator with a graphical user interface (GUI) to enable the user to achieve server consolidation with the desired quality and consistency. Other embodiments offer users a high degree of flexibility in server consolidation by allowing the users to skip steps, come back to a step, choose a singular or plural forms (for example, in one or more selected groups of servers, scenarios, and consolidation constraints), and select numerous options and choices in the process. Users are also offered choices in defining groups and scenarios, designating or marking servers with one of a plurality of usability statuses to indicate how each marked server is to be used in the server consolidation. In one embodiment, the usability statuses include a Replace status, a Reuse status, an Undecided (or don't know) status, and an Unchanged (or don't touch) status, as described later. Furthermore, users are offered choices in articulating consolidation constraints and many other key elements of the analysis, as also described later. In one embodiment the user gets results back through reports. In another embodiment the user has direct access to data in a repository for data mining and creating further reports. As referred herein, users are IT consultants, IT managers, system administrators, or any other entities that are interested in consolidating servers, rebalancing workloads of the servers, planning future server capacity, or providing server consolidation services with any combination of the first three.

FIG. 1 illustrates a high-level system architecture 100 for server consolidation in accordance with one embodiment. However, alternative embodiments of server consolidation that operate with different systems are contemplated, as understood from the present disclosure. In FIG. 1, one or more data collectors are employed for the data collection module 110. In one embodiment, a data collector is one or more software programs, applications, or modules. The data collectors are used to discover and inventory those servers within a desired environment that need to be consolidated and to collect raw performance data of such source servers (hereinafter, "source servers"). For example, a desired environment is the entire information technology (IT) infrastructure of a company, and the servers that are detected and inventoried are those that are parts of or belong to such IT infrastructure. As referred herein, information technology, or IT, encompasses all forms of technology, including but are not limited to the design, development, installation, and implementation of hardware and software information systems and software applications, used to create, store, exchange and utilize information in its various forms including but are not limited to business data, conversations, still images, motion pictures and multimedia presentations technology and with the design development, installation, and implementation of information systems and applications.

As discussed earlier, in contrast to prior art consolidation tools, it is possible to employ any known data collector or collectors for the data collection module 110 because of the flexibility of the server consolidation architecture 100 to independently operate with any and all data collectors, so long as the collected data is collected appropriately by the data collector for input into the server consolidation tool. Examples of possible data collectors include but are not limited to: HP Asset and OpenView softwares from Hewlett Packard Company of Palo Alto, Calif., BMC Discovery Express from BMC Software, Inc. of Houston, Tex.; and those data collectors available in the WMware CapacityPlanner software and CDAT software from IBM Corporation of Amonk, N.Y.

Referring back to FIG. 1, the inventory 114 of the source servers and the raw performance data 112 are processed separately, wherein the raw performance data 112 is subjected to processing by the data assurance module 120 to generate clean performance data 122, and the server inventory 114 is subjected to processing by server categorization module 130. In one embodiment, data assurance is automatically performed by the data assurance module 120, which is one or more software programs, applications, or modules having computer-executable program instructions that include code from any suitable computer-programming language, such as C, C++, C#, Java, or the like. In an alternative embodiment, data assurance is performed manually by a user reviewing the collected raw performance data based on predefined data assurance rules (for example, specifying data conditions that are considered abnormal performance) and deciding to include or exclude servers in the consolidation based on data or performance issues gathered from the review. As the clean performance data 122 is collected, it is fed to the consolidation engine 140. Alternatively, the clean performance data 122 is saved in an accessible storage space, such as a database, for access by the consolidation engine 140 as needed for desired.

At server categorization module 130, the server inventory 114 is processed for further categorization to generate a categorized server inventory 132. In one embodiment, the server categorization module 130 is performed by one or more categorization software programs, applications, or modules 131, wherein the user is provided with a graphical user interface (GUI) 133 to select predetermined criteria or filters for the server categorization or to dynamically fill in additional criteria or filters as desired or needed for the server categorization. The criteria or filters for server categorization are potentially determined by the user and based on, for example, server characteristics such as server location, functionality, environment, specification, or any combination thereof. Alternatively, the GUI 133 is operable to allow the user to select individual servers from a list in the server inventory 114. Thus, as referred herein, those tasks or functions performed by the server categorization 130 are performed by the underlying categorization software application; whereas, any interactions between server categorization module 130 and users are done via the GUI 133.

At target servers data module 180, data relating to the user-selected target platform for new servers to be used for server consolidation (hereinafter, "target servers" or "consolidated servers") is generated. As referred herein, a target platform is the underlying hardware, and associated software, used to implement a server. Thus, the target platform is, for example, a particular type of computer or type(s) of network of computers used to implement the server. In one embodiment, the target servers data module 180 includes one or more software programs, applications, or modules 181, wherein the user is provided with a GUI 183 to allow the user to select a target hardware or platform from a list of candidate server models, available from one or more server manufacturers, for new servers to be used in the server consolidation. Alternatively, the user relies on automated, predetermined policies, as programmed in the software application 181, to select a target platform based on the user's input of one or more conditions or specifications. For example, the user specifies one or more criteria for selecting a target platform, such as selecting a target platform based on CPU speed specifications. The selected target platform and its characteristics are output as the target servers data 150. In one embodiment, the GUI 183 of the target servers data module 180 is integrated with the GUI 143 of the consolidation engine 140. Alternatively, the GUI 183 is separate and distinct from the GUI 143.

The clean performance data 122, the categorized server inventory data 132, and the target servers data 150 are fed into a consolidation engine 140, which is used to further define and analyze a proposed server consolidation scenario, as will be described later. According to one embodiment, the consolidation engine 140 includes a scenario selection module 145 and a consolidation analysis module 147 that interface with users via a GUI 143. In one embodiment, each of the modules 145 and 147 includes one or more software programs, applications, or modules. The GUI 143 is menu-based or screen-based to display different menus or screens (for example, web pages) to allow different inputs from users for various server consolidation tasks performed by the underlying modules 145 and 147. For example, the GUI 143 is operable to allow the user to select a particular consolidation algorithm and set optional input parameters with the selected algorithm such as the initial number of new servers. Thus, as referred herein, those tasks or functions performed by the consolidation engine 140 are performed by the underlying modules 145 and 147, and any interactions between the consolidation engine 140 and users are done via the GUI 143. The server consolidation tasks are further described below.

The results of the consolidation analysis is output from consolidation engine 140 to a report software module 160 for the generation of reports for the user to review. The results are also saved in a consolidation central repository 170, such as a CRM, for future reference.

The server consolidation process is now described with reference to the process flow illustrated in FIG. 2, with further reference to FIG. 1. The process, or any part thereof, is potentially performed by users who are, for example, in-house IT personnel in an organization wishing to consolidate the organization's IT assets, IT consultants providing consolidation services to their customers, or a combination of both in-house IT personnel and outside IT consultants.

At 210, the server consolidation process 200 begins with the collection of inventory (114) and raw performance (112) data of source servers in a desired environment by the data collection module 110. The collection is performed by the data collection module 110 as described earlier.

At 220, the quality of the monitored raw performance data 112 is assessed to determine whether such data is of sufficient quality for use in a consolidation analysis. This quality assessment includes the use of the data assurance module 120 to clean the raw performance data 112 of the source servers. Data assurance module 120 is desirable because in practice, a number of imperfections exist in the collected raw performance data 112, and such imperfections affect the quality of consolidation analyses and recommendations. Thus, in one embodiment, data assurance module 120 includes checking the raw performance data 112 for a predefined set of imperfections, correcting at least some of the imperfections in the raw performance data, and generating clean performance data 122 of sufficient quality for use in server consolidation. In another embodiment, data assurance module 120 further deals with missing data, extra data, time synchronization, and outliers (values that are outside the expected range of a metric), for example, by excluding any server from consolidation that has too much missing data, extra data, or outliers, and by aligning different time stamps on data for time synchronization.

Furthermore, data assurance module 120 is operable to report abnormal server behaviors to the user so that the user is given an opportunity to exclude those servers with abnormal behaviors, for example, as based from the predefined set of imperfections or other predetermined criteria, from the consolidation analysis. Examples of abnormal server behaviors include but are not limited to: a server that does not always report utilization data, a server that reports too much data, a server that reports maximum utilization of a particular resource for a sustained period of time (such as 100% server memory utilization for 60 minutes). Thus, abnormal behaviors are predefined (such as those behaviors due to missing data, extra data, outliers, or latent demand) and subsequently modifiable as desired or needed. Thus, data assurance module 120 provides the user an opportunity to examine information regarding the quality of the cleaned and non-cleaned performance data that has been collected. By seeing data or performance issues on the existing source servers, the user not only obtains a performance diagnosis of the current systems but also gains a level of confidence about the quality of the consolidation analyses that are to be conducted on the performance data.

Figure 3:
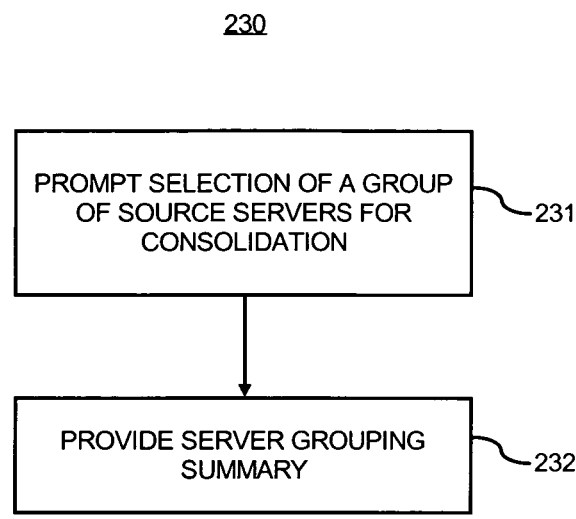
FIG. 3 illustrates details of the categorization of the server inventory in FIG. 2, in accordance with one embodiment.

At 230, concurrent with, subsequent to, or prior to the data quality assessment at 220, the server inventory 114 is categorized by the server categorization module 130. FIG. 3 illustrates further details of the categorization of the server inventory at 230. Referring now to FIG. 3, at 231, the server categorization module 130 first prompts and receives from the user a selection of a group of one or more source servers for consolidation based on some desired common characteristics of source servers in the selected group, wherein the user is given a choice to either create a new group of source servers for consolidation from a list of servers obtained from the server inventory 114 or select a group of source servers from a list of existing groups that are predefined by common server characteristics and stored in the server categorization module 130. Thus, referring back to the aforementioned example wherein the desired environment for server detection and inventory is the entire IT infrastructure of a company, the user is prompted to either create a new group of servers for consolidation from a list of all detected and inventoried servers in the IT infrastructure (found in the server inventory 114) or select a group from a list of existing groups of the detected and inventoried servers (found in the server categorization module 130 based on server information from the server inventory 114). For example, the list of existing groups of servers includes a group of servers that support the accounting department of the company, a group of servers that handle internal administrative functions of the company, and a group of servers that handle customer service functions of the company, whereby the user is able to select one of such groups for consolidation.

To create a new group of servers for consolidation, according to one embodiment as discussed earlier, the user is able to create a new group by directly selecting individual source servers from the server inventory 114. Alternatively, as also discussed earlier, the user is able to apply one or more filters, criteria, or constraints (hereinafter, "server filters") using an available menu in the GUI 133, and the underlying software application 131 correspondingly selects those servers from the server inventory 114 that match or satisfy the applied server filter(s) and outputs those servers to the categorized server inventory data 132. In one embodiment, the server filters are predetermined and program coded in the software application 131. In another embodiment, the software application 131 is operable to allow the user to dynamically create the server filters via the GUI 133. In still another embodiment, the server filters include one or more predetermined filters and one or more dynamically-created filters. The user's ability to dynamically create one or more filters for the selection of servers for consolidation, which is not provided in existing consolidation tools, provides the user with the flexibility to modify the server consolidation to meet any unexpected desires or needs, which the predefined filters would not have anticipated.

Accordingly, at 232, as the user makes a selection of a group (or groups) of servers for consolidation, the server categorization module 130 provides the user with a server grouping summary that allows the user to review and edit the selected server grouping as necessary or desired. As mentioned above, statistics about the selected group of servers, as gleaned from the clean performance data 122, are also provided to allow the user to evaluate the quality of the underlying data for such group of servers.

Figure 2:
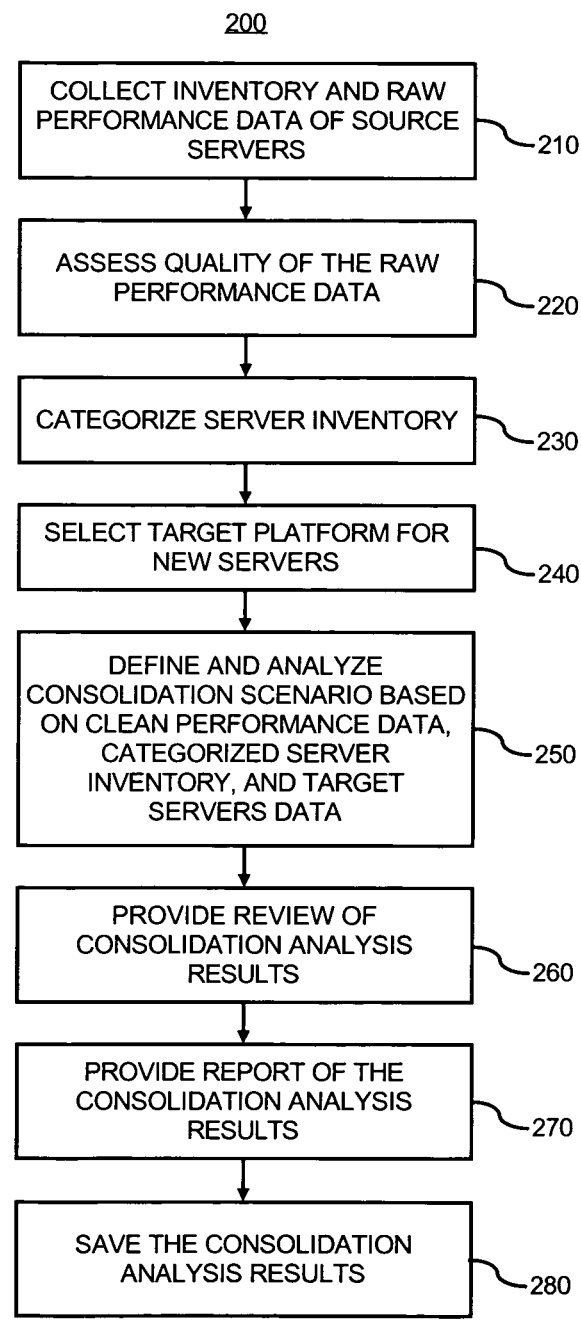
FIG. 2 illustrates a server consolidation process, in accordance with one embodiment.

Referring back to the server consolidation process 200 in FIG. 2, at 240, once the selected group of source servers is categorized for server consolidation, a target platform for one or more new target servers is selected or determined by the target servers data module 180 to replace those source servers that have been marked as Replace. In one embodiment, as discussed earlier, the target servers data module 180 is operable to provide the user with predefined, automated policies to select a target platform for new servers that is appropriate to the user's need or desire. For instance, one policy to select a target platform is based on desired or required power consumption specifications provided by the user. Another policy is based on the user's desired or required CPU speed. Still another policy is based on the user's desired or required cap on the cost of the target platform; and still another policy is based on a combination of two or more of the aforementioned policies. In an alternative embodiment, as also discussed earlier, the target servers data module 180 allows the user to select a target platform from a list of target platforms.

Figure 4:
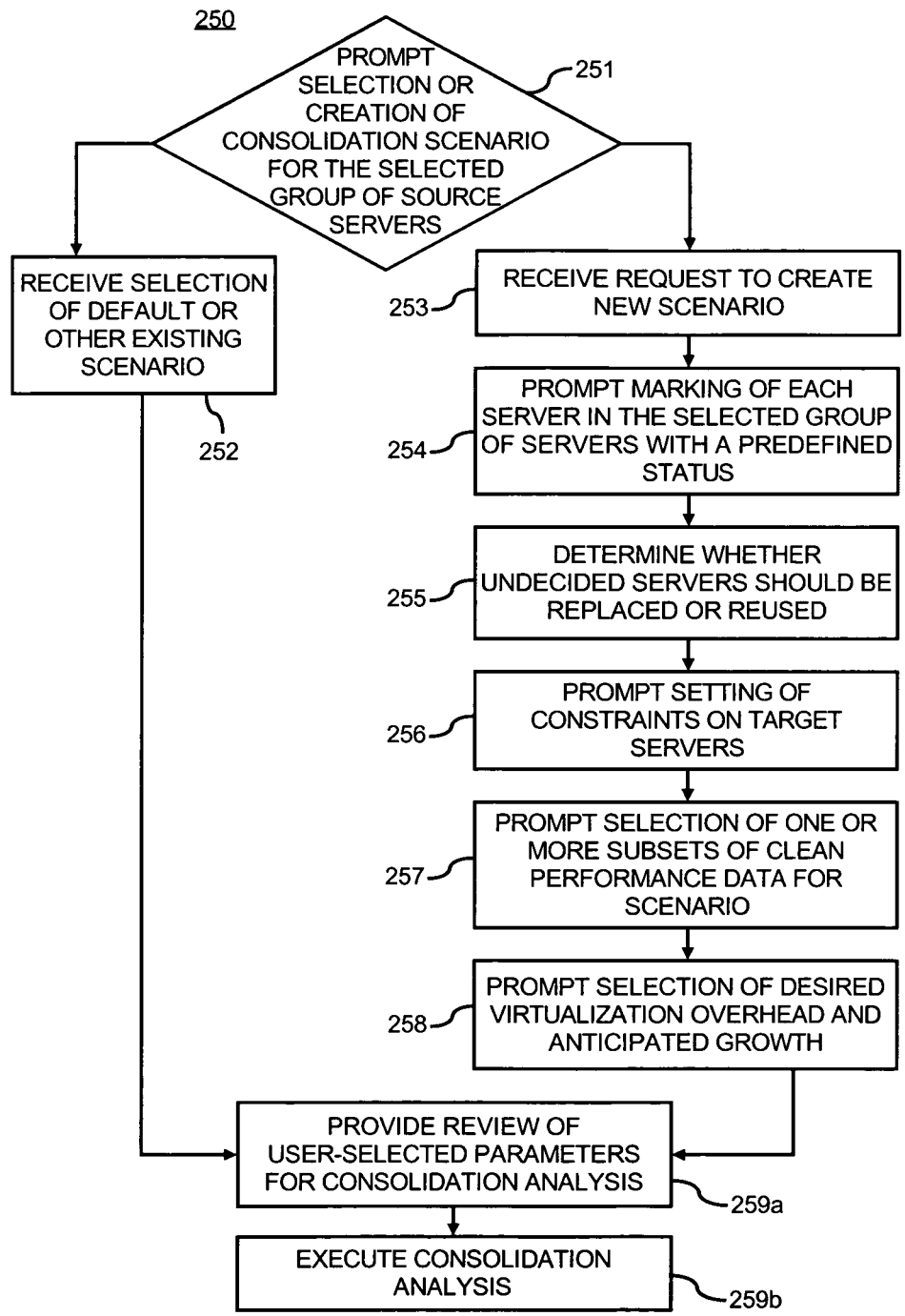
FIG. 4 illustrates the processing of the consolidation engine in FIG. 2, in accordance with one embodiment.

At 250, the consolidation engine 140 is employed to further define and analyze one or more consolidation scenarios that correspond with one or more selected groups of servers based on input of the clean performance data 122, the categorized server inventory 132, and the target servers data 150. FIG. 4 illustrates further details of the processing by the consolidation engine at 250, in accordance with one embodiment.

Referring now to FIG. 4, at 251, the scenario selection module 145 prompts the user to select or create a consolidation scenario (hereinafter, "scenario") to run for a consolidation analysis of the selected group of source servers. In one embodiment, every existing group of servers stored in the server categorization module 130 includes a predetermined default scenario that runs absent a selection by the user otherwise. For example, the first scenario for each group is the default scenario. Such default scenario is predetermined either by the user or any other authorized entity. Thus, when the user selects an existing group of source servers stored in the server categorization module 130 for consolidation, the predetermined default scenario corresponding to the selected existing group of source servers is provided for the user to select. Alternatively, the user is also able to select any other existing scenario corresponding to the selected existing group of source servers. In one embodiment, existing scenarios are stored in a CRM in the consolidation engine 140. Accordingly, at 252, the scenario selection module 145 receives a selection of the default or any other existing scenario from the user.

When the user creates a new group of servers for consolidation at 231 (FIG. 3) rather than selects an existing group of source servers, the scenario selection module 145 prompts the user to assign a group name, create a scenario to be applied to the new group, and further create a name for the scenario. Furthermore, the user is able to leverage previous settings of an existing scenario in order to create a new scenario for an existing group of servers without having to re-enter such settings for the new scenario. In other words, the user is able to proceed directly to those settings in an existing scenario that the user wants to change in order to create a new scenario. The user then assigns a new scenario name to reflect the new settings of the new scenario to be performed. Accordingly, at 253, the scenario selection module 145 receives a request to create a new scenario for the selected, newly created or existing, group of servers. In response, at 254 the scenario selection module 145 prompts the user to mark or assign each server in the selected group (or groups) with one of four usability statuses: Replace, Reuse, Undecided, and Unchanged. A Replace status indicates that the server is to be removed from use as a target (or consolidated) server for the server consolidation. A Reuse status indicates that the server is to be used as a target server subsequent for the server consolidation. Any workload (for example, application programs) currently running on a Reuse server remains on the Reuse server. An Undecided status indicates that the server is to serve as a Replace or Reuse server as necessary (for example, as a Reuse server before any new server is used for the consolidation; otherwise, as a Replace server). An Unchanged status indicates that the server is beyond the scope of the server consolidation and excluded from such consolidation because of some predetermined conditions, such as technical reasons, security reasons, policy mandates, or lack of data. A server is marked as Unchanged either by the user, if the user has knowledge that the server is beyond the scope of the server consolidation, or automatically by the server categorization module 130 based on those predetermined conditions relating to data quality assessment that have been programmed therein.

With the scenario selection module 145, the user is free to mark the selected servers based on any desired criteria, including but not limited to server characteristics (such as model, processor speed, server age, etc.) and operational decisions (such as migration to a different operating system or platform). In one embodiment, by default, all servers in a selected group for server consolidation are initially marked as Replace. However, such markings are changeable by the user via the GUI 133. For example, the GUI 133 enables the user to sort and mark the servers based on a few desired parameters, such as server model, number of CPUs, CPU speed, memory, lease expiration date, etc. In another example, the GUI 133 enables the user to select and mark individual servers from a list, wherein the GUI 133 allows the user to drag and drop into, or mark the servers as, one of four aforementioned statuses. The markings are saved by the scenario selection module 145 in, for example, a CRM in the consolidation engine 140, for the selected group of servers.

It should be noted that, as used herein, the names "Replace," "Reuse," "Undecided," and "Unchanged" are merely used to identify and differentiate the four different usability statuses that mark the selected servers for consolidation. Thus, alternative embodiments are contemplated wherein different names are used for the four statuses (for example, first status, second status, third status, and fourth status) without deviating from the meanings of the four statuses as described herein.

At 255, for any servers that have been marked Undecided, the scenario selection module 145 further determines whether those Undecided servers ultimately should be Replaced or Reused as necessary, based on predetermined policy considerations. For example, an Undecided server is determined to be Replaced if it is possible to accommodate the server's workloads by other servers in the group that has been marked as Reuse. On the other hand, an Undecided server is determined to be Reused if one or more new servers from the target servers data 150 are then required to replace the Undecided server. Alternative embodiments are contemplated, wherein the Undecided servers are determined to be Replaced or Reused based on other predetermined policy considerations, such as "Use newer systems first," "Use most powerful servers first," "Use servers in Data Center A first," etc.

At 256, once the Undecided servers are determined to be Replaced or Reused, to further define the scenario being created, the scenario selection module 145 prompts and receives from the user a selection of one or more constraints (hereinafter, "consolidation constraints") on the consolidated servers, which include, in combination or alternatively: one or more new servers from the target platform, as provided by the target servers data 150, Reuse servers as marked from the categorized server inventory 132, and those Undecided servers that are determined to be Reused at 255. Thus, the selected constraints apply to all servers (Replaced, Reuse, Undecided, new) except for the Unchanged ones. In one embodiment, the GUI 143 allows the user to enter desired values for one or more fields in a consolidation constraint. In one embodiment, each consolidation constraint includes at least four fields: a performance metric definition (such as "CPU utilization"), a time interval aggregation method or function for each defined performance metric (such as "5-minute average"), a performance limit for each defined performance metric (such as "65%"), and a probability goal for satisfying the performance limit (such as "0.995"). The probability goal, which is not provided in existing consolidation tools, is an important field in the consolidation constraint because it enables the user to set a desired efficiency level for the consolidated servers. One example of a user-defined constraint is: 5-minute average CPU-utilization not exceeding 65% of maximum CPU utilization with a probability of 0.995. Thus, the user is free to enter any performance metric (CPU, memory, disk Input/Output, network Input/Output) for which there is historical data, any time interval (5-minute, 15-minute, 1-hour, 1-day, etc.), any aggregation function (average, maximum), any limit, and any probability goal. In one embodiment, the user is able to refer to the current averages for the selected metrics for those current source servers as guidelines to setting constraints on the consolidated servers.

At 257, the scenario selection module 145 prompts the user to select one or more subsets of the clean performance data 122, as part of the definition of the scenario being created, by selecting a desired time window for each of the subsets. In one embodiment, the user is prompted by the GUI 143 to specify the beginning and ending of the time window of the historical clean performance data 122 for consideration in the consolidation analysis. This capability allows the user to specify, for instance, business hours for specific server locations to further understand the time-dynamic nature of those source servers that need to be consolidated. In one embodiment, data mining techniques are applied to detect business cycles and data availability for most IT systems in order to specify desired time windows for consolidation analyses. As mentioned earlier, statistics about the underlying data are provided for users to evaluate and assess the quality of the underlying data used in the consolidation analysis.

At 258, the scenario selection module 145 further defines the scenario being created by prompting and receiving from the user the desired virtualization overhead and the anticipated growth factor. In an alternate embodiment, the consolidation engine 140 includes a virtualization-sizing tool (not shown) that assists the user with the size and scope of the virtualization overhead desired for server consolidation. An example of such a virtualization-sizing tool includes but is not limited to the Virtualization Sizer software from Hewlett Packard. Virtualization overhead refers to the additional server resources, such as CPU utilization and memory utilization, that are needed to implementation server consolidation on physical servers. For example, multiple workloads from different source servers are consolidated onto one target server, which then runs a virtualization software (such as VMWare) to virtualize multiple machines or servers (with different operating systems, CPUs, etc.) in order to handle the multiple workloads. Thus, the virtualization software contributes to the virtualization overhead because it consumes server resources when running on the target server. Growth factor refers to the anticipated growth of the workloads in the source servers selected for server consolidation.

At 259a, before running a consolidation analysis of the selected or created scenario, the GUI 143 of the consolidation engine 140 is operable to allow the user to review and edit all the parameters the user has selected for the scenario to be analyzed, including but are not limited to: the selected group of servers for consolidation and their characteristics (at 231 and 232, FIG. 3); the number of servers in each of the Replace, Reuse, Undecided, and Unchanged categories as well as those servers that are identified for exclusion in the analysis; the time window of the consolidation analysis as set at 257; the target hardware platform from the target servers data 150; the consolidation constraints as set at 256 or associated with the selected scenario at 252; the virtualization overhead; and the anticipated growth. In one embodiment, the consolidation engine 140 is operable to allow the user to further specify a percentage to flag in the results file those consolidated servers that are within this percentage of reaching the limit. For example, the user is interested in flagging those consolidated servers that are within 10% of reaching their limits to determine how close the consolidation result is to achieving the metric objectives. In turn, the user is able to run additional consolidation scenarios to determine different consolidation results under different metric objectives.

At 259b, the consolidation engine 140 invokes a consolidation analysis software program, application, or module 147 to run a consolidation analysis of the consolidated servers based on the user-selected or created scenario and parameters therein. Examples of consolidation analysis software applications that are operable in the consolidation engine 140 include but are not limited to those consolidation analysis engines in the IBM CDAT and WMware CapacityPlanner. In one embodiment, the user is able to select multiple groups of servers (and a selected or created scenario corresponding to each of the selected groups) at once for server consolidation analysis and comparisons between the different scenarios, wherein the selected groups include newly-created groups of servers, existing groups of servers, or both newly-created and existing groups of servers. Here, the scenario selection module 145 takes into account potential conflict issues that possibly arise from a server that belongs to more than one selected group and is thus marked differently and subjected to different scenarios in different groups (such server marking is further described later). The format of data, such as server characteristics gleaned from the clean performance data 122 and corresponding scenario, for each selected server group is organized in a tabular format, similar to a spreadsheet, to enable quick viewing, scrolling, sorting, filtering, and summarization.

Referring back to the server consolidation process 200 in FIG. 2, at 260, before saving the results of the consolidation analysis, the consolidation engine 140 is operable to allow the user to review the results prior to saving such results in a consolidation central repository 170. In one embodiment, the results that are displayed by the GUI 143 include, but are not limited to, the number of servers before and after consolidation and the analyzed scenario and its effect to each of the servers involved in the consolidation process. With an analyzed consolidation scenario, the user is able to spot in the list those servers that had data or performance issues. Such visibility allows the user determine the level of confidence with the consolidation analysis. For example, if a lot of servers have data or performance issues, the consolidation analysis has limited value and is not reliable. The analyzed consolidation scenario also provides the user with the predicted probabilities of meeting each of the user-defined consolidation constraints, wherein servers that do, or do not, meet, for example, the desired threshold probability for one or more of the consolidation constraints are highlighted or marked so as to notify the user. An analyzed consolidation scenario further provides predicted high and average watermarks, based on historical data and anticipated growth, for each of the metrics in the user-defined constraints, identification (for example, through highlighting or marking) of target servers that are close to such watermarks, as discussed above regarding the flagging of the servers prior to running the consolidation analysis. Once the user accepts the consolidation scenario for each of the servers, the user is able to save the results of the consolidation analysis using the assigned name of the scenario.

In one embodiment, the user is able to run another consolidation analysis by going through the server consolidation process 200 in FIG. 2, beginning at any of the positions 230-250 described above. It should be noted that the user is able to iterate through quality assessment of the raw performance data at 220 multiple times to conduct preliminary analyses before all data is available for server consolidation.

At 270 in FIG. 2, once the user has conducted and reviewed all the needed consolidation analyses, the user is able to select all or a subset of the consolidation analyses to be summarized in professional documents such as reports in Word format or as presentations in PowerPoint format with the report module 160 (FIG. 1). As stated earlier, it is possible to include in the reports information such as predicted high and average watermarks of the target servers. At 280, the results of the consolidation analyses are saved or deposited in a consolidation central repository 170, such as a server having a CRM, for storage and subsequent reporting with the report module 160. For example, the user submits the results files, documents, or reports of the selected analyses to a central website that generates in return multiple user documents that contain pre-generated text (standard as well as custom text based on the data), charts, and tables. Through the submission process, several major objectives are achieved: the consolidation results are consistently provided across multiple users, the results documents are consistently reported, and critical data of the results are stored in a consolidation central repository 170 that is accessible at a later time to improve the consolidation analysis module 147 and supplement the results of future consolidation analyses.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A computer-readable storage device on which is encoded program code performing a method for server consolidation, the method comprising:
    collecting performance data of a plurality of source servers in a desired environment;
    selecting a first group having one or more source servers from the plurality of source servers for consolidation;
    marking each source server in the first group initially with a replace status, a reuse status or an undecided status;
    re-marking any source server in the first group that is marked with the undecided status with one of the replace status and the reuse status based on a predetermined policy consideration;
    selecting a target platform as a first target platform for a new server that replaces any source server in the first group based on the initially marked statuses of the source servers and the re-marked status of any of the source servers initially marked with the undecided status; and
    performing a first server consolidation analysis of the first group based at least on the collected performance data, and the first selected target platform.

2. The computer-readable storage device of claim 1, wherein the method further comprises:
    repeating:
        marking the each source server in the first group, wherein at least one source server in the first group is marked with another status that is different from the initially marked replace, reuse or undecided status of the at least one source server; and
        selecting the target platform for the new server, wherein the target platform is a second target platform that is different from the first target platform;
    performing a second server consolidation analysis of the first group based at least on the collected performance data and the another marked status of the at least one source server in the first group and the second target platform; and
    providing results of the first server consolidation analysis and the second server consolidation analysis for comparison.

3. The computer-readable storage device of claim 1, wherein the method further comprises:
    collecting an inventory of the plurality of source servers;
    and wherein the selecting of the first group includes one of,
        receiving a selection of a group of source servers from the collected inventory; and
        receiving a selection of an existing group of source servers from a list of existing groups of inventoried source servers that are predefined by common server characteristics, that are included in the collected inventory.

4. The computer-readable storage device of claim 1, wherein the performed server consolidation analysis is further based on a virtualization overhead for the server consolidation and an anticipated growth of the desired environment.

5. The computer-readable storage device of claim 1, wherein the selecting the first group comprises:
    predefining one or more filters for selecting a group of one or more source servers from the plurality of source servers;
    receiving as input one or more of the predefined filters for selecting the first group;
    receiving as input one or more dynamically-created filters for selecting the first group; and
    selecting the first group based on one of,
        the received one or more predefined filters; and
        the received one or more dynamically-created filters and the received one or more predefined filters.

6. The computer-readable storage device of claim 1, wherein the performing the server consolidation analysis comprises:
    receiving as input one or more time windows, each for a subset of the collected performance data; and
    performing the server consolidation analysis of the first group with a computerized system based on the one or more subsets of the collected performance data for the one or more time windows, the marking of each source server in the first group, the selected target platform, a virtualization overhead for the server consolidation, and an anticipated growth of the desired environment.

7. The computer-readable storage device of claim 1, wherein the one or more filters is based on one or more of a location, functionality, environment, and specification of a server.

8. The computer-readable storage device of claim 1, wherein:
   the selecting the target platform as the first target platform includes for any source server in the first group marked with the replace status, removing the source server marked with the replace status from selection as the first target platform; and for any source server in the first group marked with a reuse status, selecting at least one of the source servers marked with reuse status as the first target platform, wherein any workload currently running on the selected at least one source server remains on the at least one server.

9. A non-transitory computer-readable storage device on which is encoded program code performing a method for providing a server consolidation service to a customer, the method comprising:
   accessing performance data of a plurality of source servers, the performance data originating from the customer;
   categorizing the plurality of source servers into at least a first group of source servers for a server consolidation;
   marking each source server in the first group of source servers initially with a replace status, a reuse status, or an undecided status;
   re-marking any source server in the first group that is marked with the undecided status with the replace status or the reuse status based on a predetermined policy consideration;
   selecting a target platform for a new server to replace at least one source server in the first group of source servers based on the initially marked statuses of the source servers and the re-marked status of any of the source servers initially marked with the undecided status;
   defining a consolidation scenario for the first group of source servers, the consolidation scenario including a set consolidation constraints for one or more consolidated servers resulting from the server consolidation, whereby the consolidation constraint includes a probability goal identifying a probability for satisfying a performance limit of the one or more consolidated servers;
   performing a server consolidation analysis of the first group of source servers based at least on the accessed performance data of the first group of source servers, the selected target platform, and the defined consolidation scenario to determine whether the new server, one or more source servers in the first group of source servers, or any combination thereof are to serve as the one or more consolidated servers; and
   providing the customer with a result of the performed server consolidation analysis.

10. The non-transitory computer readable storage device of claim 9, wherein:
    performing the server consolidation analysis comprises determining a probability of each of the one or more consolidated servers achieving the set consolidation constraint; and
    providing the customer with the result of the performed server consolidation analysis includes identifying any of the one or more consolidated servers having the probability of achieving the set consolidation constraint less than a predetermined probability threshold.

11. The non-transitory computer readable storage device of claim 9, wherein categorizing the plurality of source servers into at least a first group of source servers for the server consolidation comprises:
    predefining a filter for selecting one or more source servers from the plurality of source servers;
    providing input for a dynamic creation of a filter for selecting one or more source servers from the plurality of source servers; and
    categorizing the plurality of source servers into at least the first group of source servers for the server consolidation based on the predefined filter, the dynamically-created filter, or a combination thereof.

12. The non-transitory computer readable storage device of claim 9, wherein the marking comprises:
    the selecting the target platform includes for any source server in the first group marked with the replace status, removing the source server marked with the replace status from selection as the target platform; and for any source server in the first group marked with a reuse status, selecting at least one of the source servers marked with reuse status as the target platform, wherein any workload currently running on the selected at least one source server remains on the at least one server.

13. The non-transitory computer readable storage device of claim 9, further comprising:
    defining another consolidation scenario for the first group of source servers, the another consolidation scenario including another set consolidation constraint for the one or more consolidated servers resulting from the server consolidation;
    performing another server consolidation analysis of the first group of source servers based at least on the accessed performance data of the first group of source servers, the selected target platform, and the another defined consolidation scenario to determine whether the new server, one or more source servers in the first group of source servers, or any combination thereof are to serve as the one or more consolidated servers;
    providing the customer with another result of the another performed server consolidation analysis for comparison with the result of the performed server consolidation analysis.

* * * * *